United States Patent [19]

Estes et al.

[11] Patent Number: 5,299,359
[45] Date of Patent: Apr. 5, 1994

[54] METHOD AND SYSTEM FOR MEASUREMENT OF INTERNAL TUBE DIMENSIONS WITHIN A WELLBORE

[75] Inventors: James D. Estes, Arlington; Bruce E. Dennis, Fort Worth, both of Tex.

[73] Assignee: Computalog Research, Inc., Fort Worth, Tex.

[21] Appl. No.: 79,706

[22] Filed: Jun. 18, 1993

Related U.S. Application Data

[63] Continuation of Ser. No. 877,540, May 1, 1992, abandoned.

[51] Int. Cl.$^5$ ............................................. G01B 7/12
[52] U.S. Cl. .................................... 33/544; 33/544.3; 33/DIG. 5; 364/422
[58] Field of Search ..................... 33/544, 544.1, 544.2, 33/544.3, DIG. 5; 364/560, 569, 422; 340/853.1

[56] References Cited

U.S. PATENT DOCUMENTS

| | | | |
|---|---|---|---|
| 2,908,085 | 10/1959 | Price et al. | 33/544.3 |
| 4,186,494 | 2/1980 | Edouard et al. | 33/544.3 |
| 4,302,881 | 12/1981 | Schwind et al. | 33/544.3 |
| 4,559,709 | 12/1985 | Beseme et al. | 33/544.3 |

FOREIGN PATENT DOCUMENTS

8502674 6/1985 World Int. Prop. O. ......... 33/544.3

*Primary Examiner*—William A. Cuchlinski, Jr.
*Assistant Examiner*—Alvin Wirthlin

*Attorney, Agent, or Firm*—Andrew J. Dillon

[57] ABSTRACT

A caliper logging sonde is provided having a plurality of sensing fingers each of which is pivotally mounted to the sonde and movable with respect to the sonde in response to variations in the internal dimensions of a wellbore tube through which the sonde passes. An electrical signal which is proportional to variations in the internal dimensions of a wellbore tube is determined at regular time intervals at a series of points around the circumference of the wellbore tube. A maximum and minimum dimension for each point around the circumference of the wellbore tube during a selected time interval is temporarily stored and thereafter transmitted to the surface at regular intervals. A high density array of sensors is provided by utilizing a transducer plate having a large number of cylindrical apertures disposed around the circumference thereof. Thimble members, each having an internal chamber and an elongate body narrower than the cylindrical aperture are fixedly inserted into one end of each of the detector plate apertures while an associated electrical coil is inserted into each aperture from the other end, surrounding the elongate body. Movable magnetic rods within the internal chamber of each thimble are then variably positioned in response to movement of the sensing fingers and the variable inductance of each electrical coil is then utilized to produce an electrical signal proportional to variations in the internal dimensions of the tube under measurement.

14 Claims, 4 Drawing Sheets

METHOD AND SYSTEM FOR MEASUREMENT OF INTERNAL TUBE DIMENSIONS WITHIN A WELLBORE

This application is a continuation of application Ser. No. 07/877,540, filed May 1, 1992, abandoned.

BACKGROUND OF THE INVENTION

1. Field of the Invention

This invention relates in general to methods and systems for accurately measuring the internal dimensions of a tube within a borehole and in particular to a method and system for measuring and storing maximum and minimum variations in internal dimensions of a tube within a borehole over a predetermined time interval. Still more particularly, the present invention relates to a system for providing highly accurate measurement of borehole tube internal dimensions utilizing a large number of closely spaced detectors.

2. Description of the Prior Art

The modern petrochemical industry utilizes a large number of tubes which are designated primarily for the circulation of fluids within a wellbore. Notable examples of such tubes are those utilized for well drilling and fluid circulation in an oil well. In actual practice, it is often necessary to measure the ovalization or corrosion of either the internal or external surfaces of these tubes to ensure that tubing which is about to fail is replaced. Such measurements are often carried out in atmospheres which may deleterious or difficult to reach, for example at the bottom of an oil well in the case of tubing strings. In order to carry out these measurements, provisions must be made for a reliable and accurate measurement which operates in a simple and straightforward manner.

Early systems for measuring the shape of a cylindrical tube within a wellbore were primarily impression-taking devices of a mechanical type which may produce electrical signals as a result of mechanical contact between the measuring device and a dimension of the tubing. Typically such devices utilizing an engraving stylus on a substrate for the purpose of marking a curve which corresponds to ovalization of a cylinder or to surface defects within the cylinder. These devices are complicated by reason of the fact that they require high precision mechanical transmission systems and the fact that a mechanical marking operation impairs the sensitivity of the measurement over time. Moreover, such devices do not immediately deliver usable information since the device must be removed to the surface of a wellbore for analyzation after the measurements have been taken.

Electromechanical devices utilizing multiple feeler arms have been proposed which overcome this mechanical device problem. One example is set forth in U.S. Pat. No. 4,186,494, Peruchon Edouard et al., issued Feb. 5, 1980. The transducers set forth within the above-referenced United States patent are quite bulky and only a limited number of fingers may be placed around a sonde owing to the space necessary for corresponding transducers within the sonde.

More recently, U.S. Pat. No. 4,559,709, issued to Beseme et al., Dec. 24, 1985, discloses a technique whereby multiple sensing fingers are provided, each movable with respect to a sonde. A mobile member attached to each sensing finger and movable in response to movement of the finger is placed within an electric coil and is utilized to vary the inductance of that coil in response to variations in the internal dimensions of a tube. Thereafter, the device may be periodically interrogated from the surface, utilizing a signal transmitted over a conductive cable, and the output of each transducer is then transmitted to the surface, providing an indication of defects or irregularities in the internal dimensions of a tube within a borehole.

While each of these systems represents an adequate method for measuring the internal dimensions of a tubular member within a borehole, several shortfalls have been experienced with these devices. For example, the Beseme et al. device transmits the output of each transducer to the surface in response to an interrogation from the surface and thus defects which are located physically between two points within the tube at which an interrogation takes place will not be noted utilizing a tool of this type. Additionally, the transducers described therein, while an improvement over Peruchon Edouard et al., still require a substantial amount of space and therefore preclude the provision of a large number of sensing figures which might be utilized to provide a highly accurate indication of irregularities within the internal dimensions of a tubing member within a borehole.

It should therefore be apparent that a need exists for a method and system which permits highly accurate measurements of the internal dimensions of a tube within a borehole utilizing a large number of sensing transducers disposed circumferentially about a measurement tool.

SUMMARY OF THE INVENTION

It is therefore one object of the present invention to provide an improved method and system for accurately measuring the internal dimensions of a tube within a borehole.

It is another object of the present invention to provide an improved method and system for measuring and storing maximum and minimum variations in internal dimensions of a tube within a borehole over a predetermined period of time.

It is yet another object of the present invention to provide an improved system which may be utilized to measure, in a highly accurate manner, the variations of internal dimension of a tube within a borehole utilizing a large number of closely spaced detectors.

The foregoing objects are achieved as is now described. A caliper logging sonde is provided having a plurality of sensing fingers each of which is pivotally mounted to the sonde and movable with respect to the sonde in response to variations in the internal dimensions of a wellbore tube through which the sonde passes. An electrical signal which is proportional to variations in the internal dimensions of a wellbore tube is determined at regular time intervals at a series of points around the circumference of the wellbore tube. A maximum and minimum dimension for each point around the circumference of the wellbore tube during a selected time interval is temporarily stored and thereafter transmitted to the surface at regular intervals. A high density array of sensors is provided by utilizing a transducer plate having a large number of cylindrical apertures disposed around the circumference thereof. Thimble members, each having an internal chamber and an elongate body narrower than the cylindrical aperture are fixedly inserted into one end of each of the detector plate apertures while an associated electrical coil is inserted into each aperture from the other end, surrounding the elongate body. Movable magnetic rods within the internal chamber of each thimble are then variably positioned in response to movement of the sensing fingers and the variable inductance of each electrical coil is then utilized to produce an electrical signal proportional to variations in the internal dimensions of the tube under measurement.

Additional objectives, features and advantages will be apparent in the written description which follows.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
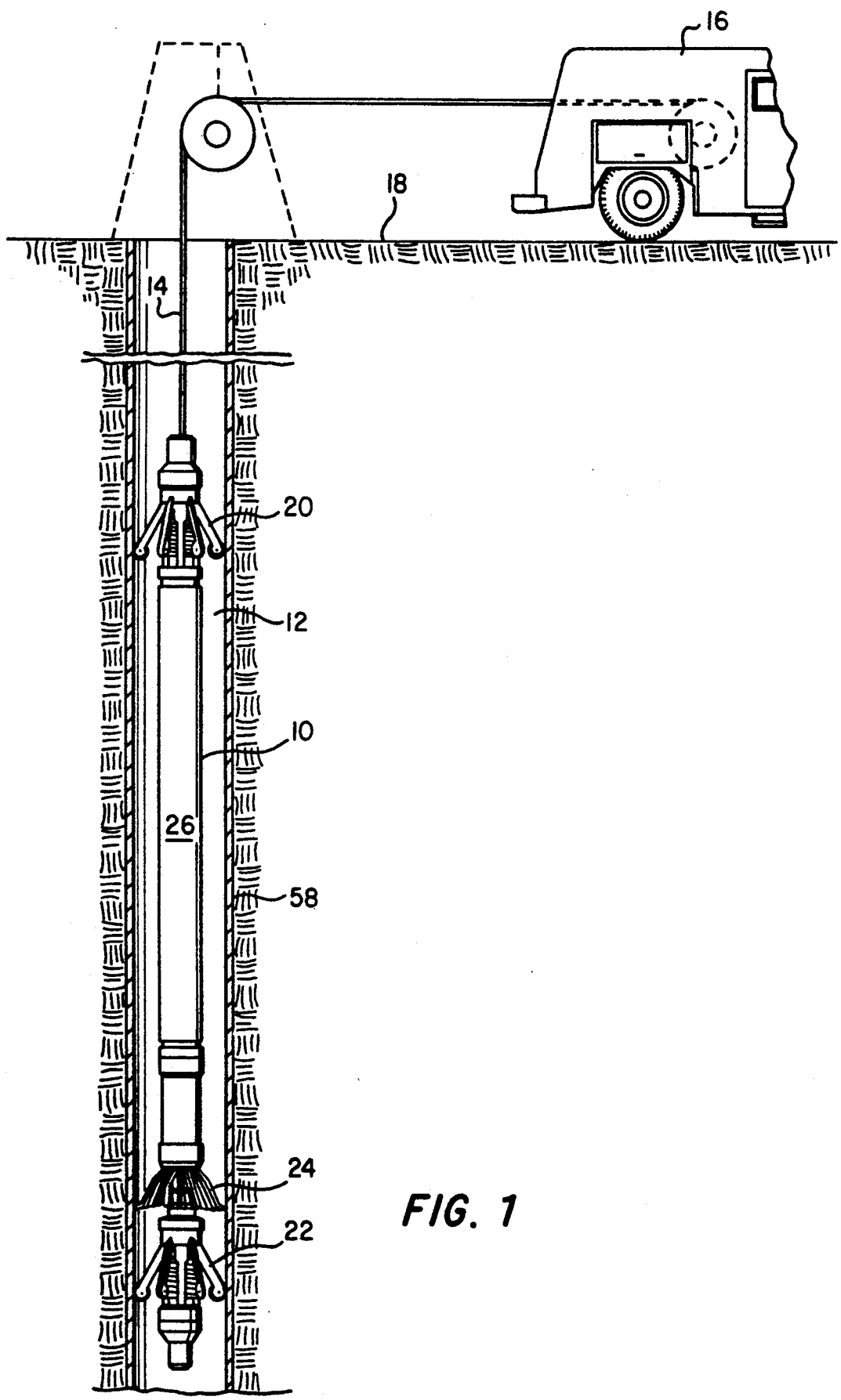
FIG. 1 is a partially schematic view of a caliper logging sonde within a borehole which has been constructed in accordance with the method and system of the present invention.

With reference now to the figures and in particular with reference to FIG. 1, there is depicted a partially schematic view of a caliper logging sonde 10 within a borehole 12 which has been constructed in accordance with the method and system of the present invention. As illustrated, caliper logging sonde 10 is supported by conductive cable 14 which is utilized to electrically couple caliper logging sonde 10 to a surface electronics system (not shown) generally disposed within truck 16 on surface 18 above borehole 12.

As illustrated, caliper logging sonde 10 preferably includes a plurality of upper centering arms 20, and a plurality of lower centering arms 22 which are utilized to centralize caliper logging sonde 10 within borehole 12 in a manner well known in the art. A plurality of sensing fingers 24 are provided and are utilized, in a manner which will be explained in greater detail herein, to detect ovalization and/or defects within the internal dimensions of tube 58 which is suspended within borehole 12 in a manner well known in the art. Additionally, caliper logging sonde 10 preferably includes an electronics section 26 which serves to house the various electronic assemblies which are utilized in conjunction with sensing fingers 24 to provide an electrical signal which is representative of defects and/or ovalization in the internal dimensions of tube 58.

Figure 2A:
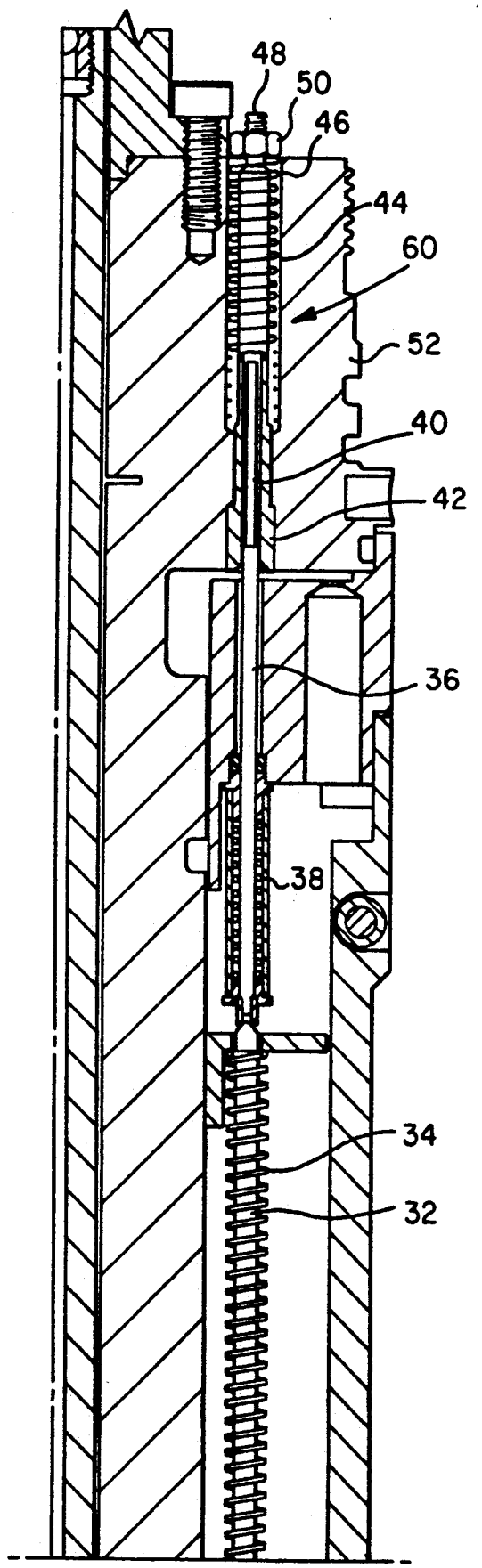
FIGS. 2a and 2b, when viewed together, form a partial cutaway view of one sensing finger and an associated transducer in the caliper logging sonde of FIG. 1.
Figure 2B:
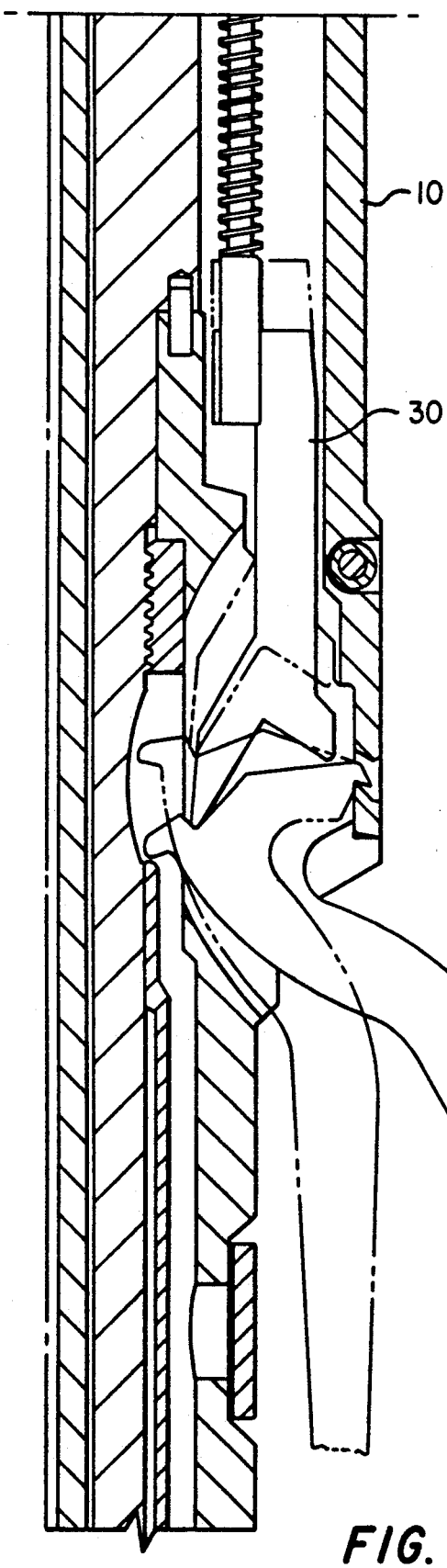

Referring now to FIGS. 2a and 2b, these figures, when viewed together, form a partially cut-away view of one sensing finger 28 and an associated transducer 60 within caliper logging sonde 10 of FIG. 1. As illustrated, sensing finger 28 is preferably pivotally mounted to caliper logging sonde 10 in a manner such that sensing finger 28 may be moved with respect to caliper logging sonde 10 in response to variations in the internal dimensions of tube 58. As illustrated, variations in the position of sensing finger 28 will result in a longitudinal movement of sliding block 30.

Sliding block 30, as illustrated within FIGS. 2a and 2b, is mechanically coupled to transmission rod 32. Transmission rod 32 is centered within spring 34, which is utilized to urge sensing finger 28 away from caliper logging sonde 10, in order to urge sensing finger 28 into contact with the internal dimensions of tube 58.

At the upper end of transmission rod 32 is a transducer rod 36 which is urged into contact with the upper end of transmission rod 32 by means of spring 38. As illustrated, the upper end of transducer rod 36 comprises a magnetic rod 40 which is inserted within an internal chamber of thimble member 42. Thimble member 42 is preferably constructed of a nonmagnetic material, such as titanium, and is inserted into cylindrical aperture 44 within transducer plate 52, in a manner which will be explained in greater detail herein.

As illustrated, thimble member 42 preferably includes an elongate body portion which is narrower in diameter than the internal dimensions of cylindrical aperture 44 so that electrical coil 46 may be inserted into cylindrical aperture 44 from the upper surface thereof, surrounding the elongate body portion of thimble member 42. A threaded stud 48 is provided on the closed end of thimble member 42 and a nut 50 may then be utilized to fixedly retain coil 46 within cylindrical aperture 44 in the manner illustrated.

Thus, as those skilled in the art will appreciate upon reference to the foregoing, movement of sensing finger 28 toward and away from caliper logging sonde 10 will be translated into longitudinal movement, via transmission rod 32, which is then utilized to urge transducer rod 36 into and out of internal chamber 56 of thimble member 42. By urging magnetic rod 40 on the end of transducer rod 36 into and out of the internal chamber within thimble member 42, the effective inductance of coil 46 is altered, resulting in an electrical signal which varies in response to variations in the internal dimension of tube 58 at each of a plurality of points around the circumference of caliper logging sonde 10.

Figure 3:
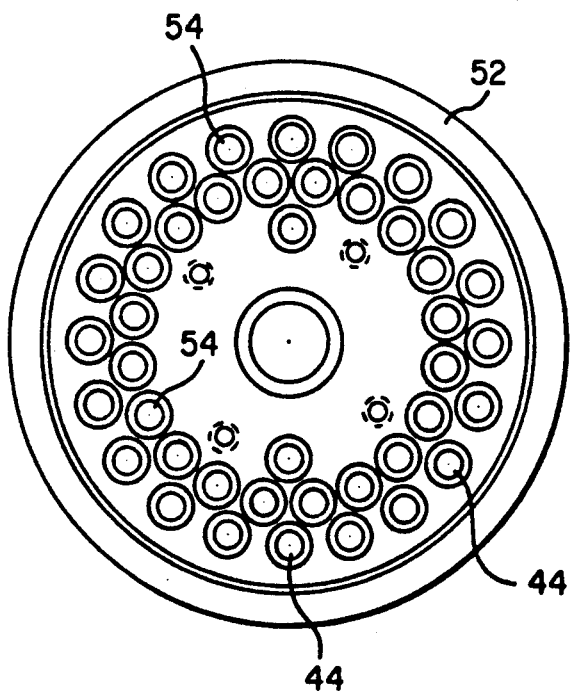
FIG. 3 is a plan view of a transducer plate within the caliper logging sonde of FIG. 1.

With reference now to FIG. 3, there is depicted a plan view of transducer plate 52. As illustrated, transducer plate 52 preferably includes a large number of cylindrical apertures 44. When constructing a caliper logging sonde in the manner disclosed within the present application, it is possible to produce a highly dense array of transducers, resulting in a much more accurate ability to detect defects, pitting or the like within the internal dimensions of tube 58. In the depicted embodiment of the present invention forty cylindrical apertures 44 are provided within transducer plate 52. Each cylindrical aperture includes an upper and lower end and are preferably provided by simply drilling the cylindrical apertures within a transducer plate provided utilizing a nonmagnetic material, such as titanium.

Figure 4:
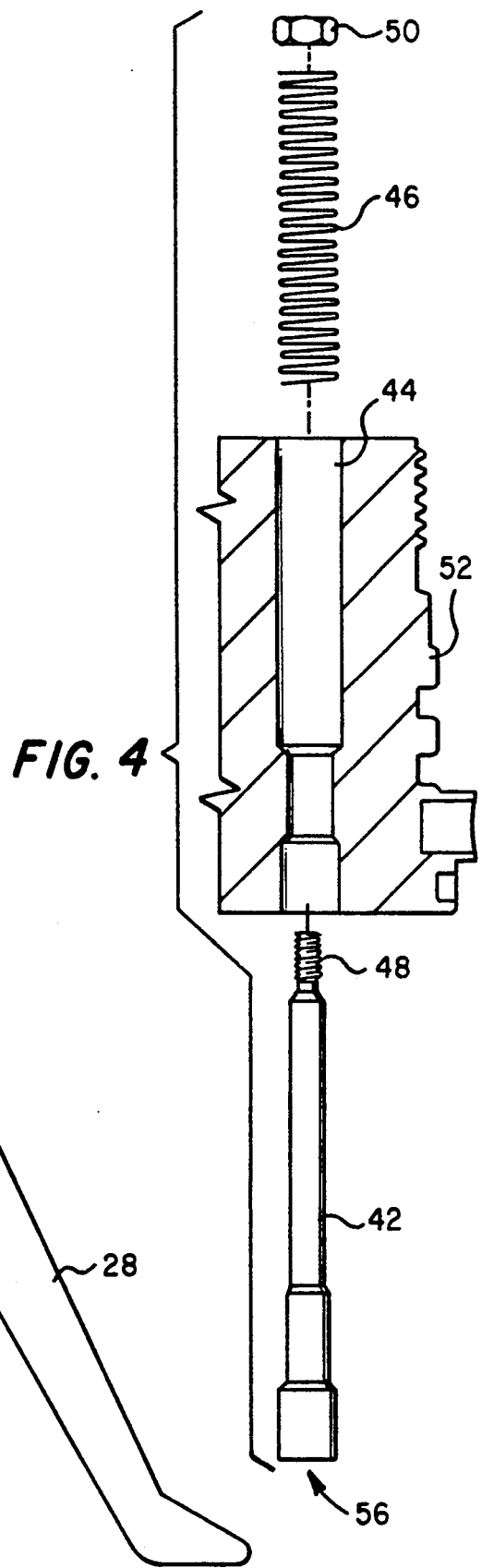
FIG. 4 is an exploded view illustrating the assembly of one transducer within the caliper logging sonde of FIG. 1.

Referring now to FIG. 4, there is illustrated an exploded view depicting the assembly of one transducer within caliper logging sonde 10 of FIG. 1. As illustrated, transducer plate 52 includes a plurality of cylindrical apertures, a single one of which, 44, is depicted for purposes of illustration. Thimble member 42, which includes a threaded stud 48 and an internal chamber 56 is then inserted into cylindrical aperture 44 from one side thereof and fixedly mounted within cylindrical aperture 44. Those skilled in the art will appreciate that this may be accomplished utilizing welding, brazing, or any other suitable technique.

As illustrated, thimble member 42 preferably includes an elongate body portion having an external diameter which is substantially smaller than the internal diameter of cylindrical aperture 44. Thus, coil 46 may be inserted into cylindrical aperture 44 from the other end thereof, surrounding the elongate body portion of thimble member 42. As depicted in FIG. 2a, a nut 50 may then be utilized to secure electrical coil 46 within cylindrical aperture 44, surrounding the elongate body portion of thimble member 42.

In this manner, it is possible to construct a transducer plate such as transducer plate 52 which includes a large number of densely located transducers, resulting in the ability of caliper logging sonde 10 to detect defects within the internal dimensions of tube 58 within a radial accuracy of nine degrees. However, those skilled in the art will appreciate that by disposing a third cylindrical array of apertures within transducer plate 52 it is possible to include an even more dense array of transducers, such as sixty transducers. In this manner, defects or pitting within the internal dimensions of tube 58 may be detected within an accuracy of six degrees.

Figure 5:
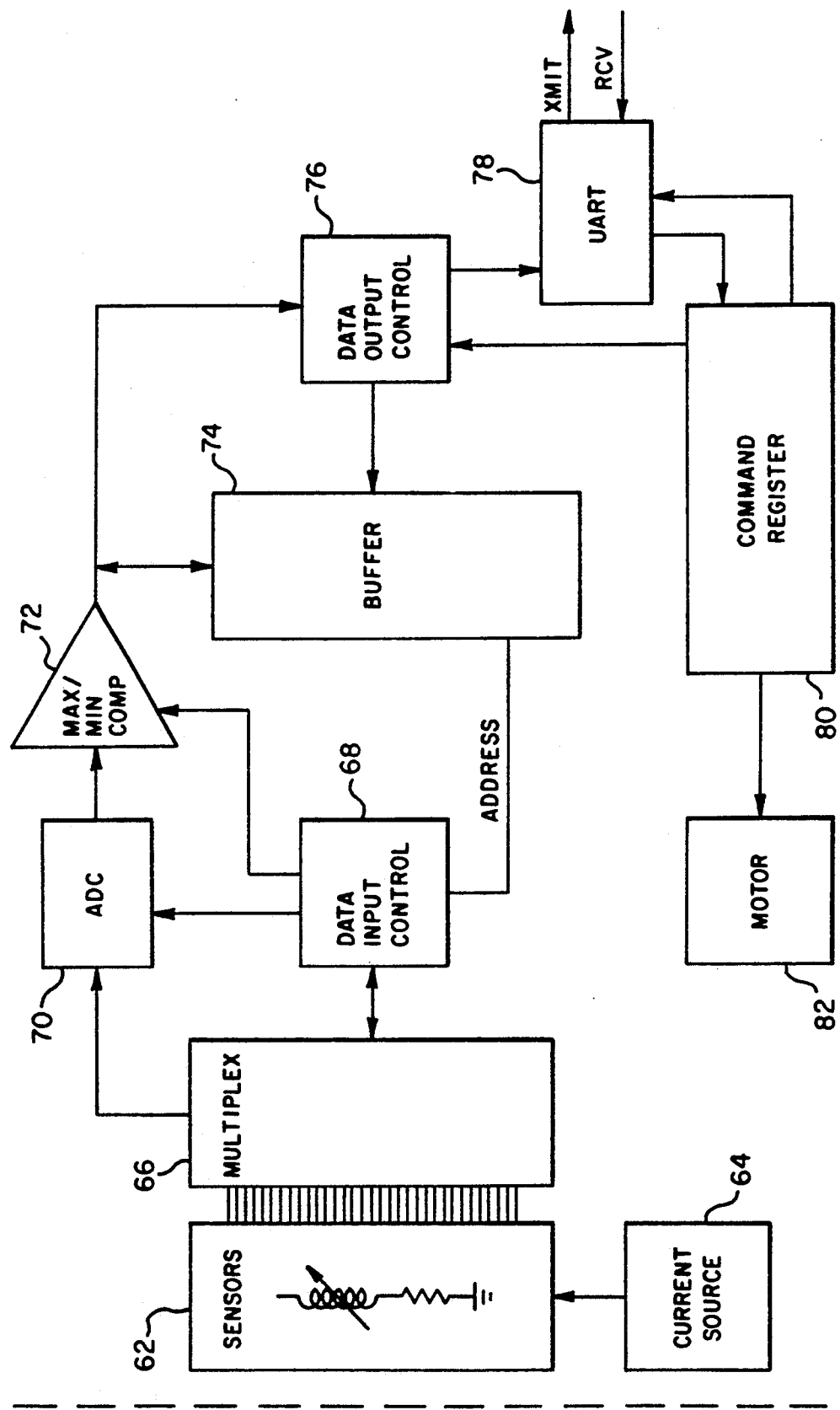
FIG. 5 is a high level block diagram of the electronic assemblies which may be utilized to implement the caliper logging sonde of FIG. 1.

Referring now to FIG. 5, there is depicted a high level block diagram of the electronic assemblies which may be utilized to implement caliper logging sonde 10 of FIG. 1. As illustrated, a plurality of sensors 62 are depicted. As illustrated schematically within block 62, each sensor preferably comprises a variable inductor which varies in inductance in response to variations in the position of magnetic rod 40 within the internal chamber of thimble member 42 (see FIG. 2a). A resistor is also preferably coupled in series with each coil and a current source 64 is then periodically applied to each sensor. The application of current to a sensor formed of a series connected variable inductor and resistor will result in an initial high voltage which will then decay exponentially approaching the voltage which will result from the applied current flowing strictly through the series resistor.

Thereafter, as set forth within the aforementioned U.S. Pat. No. 4,559,709, the current source may be removed, resulting in a so-called "fly back" reaction as a result of the inductance of the variable inductor within each sensor. A large negative voltage will be generated and that voltage will decay back to zero as the current from the inductor decays.

Thus, as those skilled in the art will appreciate, the time which this current takes to decay to a specified level or the amount of current present at a specified time may be utilized to determine the variable inductance of each individual sensor at a particular time instant. By repetitively and sequentially coupling current source 64 to sensors 62, variations in the internal dimensions of tube 58 may be and accurately rapidly determined. However, as those skilled in the art will appreciate, the bandwidth required to transmit a large number of such readings to the surface from caliper logging sonde 10 is generally not available.

Therefore, in accordance with an important feature of the present invention, the interval dimensions of tube 58 at a plurality of points around the circumference of caliper logging sonde 10 are determined in rapid succession and coupled, via multiplex 66 to analog-to-digital converter 70. This is accomplished, in manner well known in the art, utilizing data input control 68. Thereafter, the output of analog-to-digital converter 70 is coupled to maximum/minimum comparator 72.

In accordance with an important feature of the present invention, each measurement of a sensor at each point around the circumference of caliper logging sonde 10 is measured at a plurality of time instants and the maximum and minimum measurement obtained during an interval of multiple instants thereby is stored within buffer 74. Thus, by utilizing a digital comparator, such as the one schematically depicted at reference numeral 72, the maximum and minimum measurement during designated time intervals for each sensor around the circumference of caliper logging sonde 10 may be determined and temporarily stored.

Data input control 68 preferably stores each maximum and minimum within buffer 74, which, in the depicted embodiment of the present invention, is capable of storing eighty data words. That is, the maximum value and minimum value for each of the forty sensors within sensor 62. Thereafter, in response to a command polling signal from the surface, which is received via Universal Asynchronous Receiver/Transmitter 78 (UART) and decoded at command register 80 data output control 76 is utilized to transfer the contents of buffer 74 to the surface via Universal Asynchronous Receiver/Transmitter 78.

Additionally, as those skilled in the art will appreciate, Universal Asynchronous Receiver/Transmitter 78 (UART) may be utilized to generate commands to motor 82 which may be utilized, in a manner similar to that typically utilized in tools of this type, to retract sensing fingers 24 during insertion of caliper logging sonde 10 within borehole 12.

Thus, upon reference to the foregoing those skilled in the art will appreciate that caliper logging sonde 10 of the present invention may be utilized to repeatedly measure variations in the internal dimensions of borehole tubing at a plurality of time instants and the maximum and minimum value detected at each of a plurality of points around the circumference of the sonde during selected intervals may be stored within a temporary buffer. Thereafter, a polling command from the surface may be utilized to upload the contents of buffer 74 to the surface, resulting in a tool which is capable of detecting pitting and/or corrosion in the internal dimensions of borehole tubing at any point between polling commands.

Additionally, the novel construction of transducer plate 52 may be utilized to provide a highly dense array of transducers such that defects within the internal dimensions of borehole tubing may be detected at a large number of points around the circumference of caliper logging sonde 10. It should thus be apparent that caliper logging sonde 10 may be utilized to perform highly accurate and very thorough surveys of the internal dimensions of a borehole tube with a high degree of assurance that all defects within the internal dimensions of that tube will be noted within the resultant log.

While the invention has been shown in only one of its forms, it is not thus limited but is susceptible to various changes and modifications without departing from the spirit thereof.

What is claimed is:

1. An apparatus for measuring the internal dimensions of a tube within a wellbore, said apparatus comprising:
    an elongate sonde adapted to be suspended within said wellbore by an electrical conductor and movable within a tube to be measured within said wellbore;

a plurality of sensing fingers mounted on said elongate sonde and movable with respect to said elongate sonde in response to variations in said internal dimensions of said tube, during movement of said elongate sonde within said tube;

detection means disposed within said elongate sonde for producing an electrical signal in response to the position of each of said plurality of sensing fingers at each of a plurality of time instants;

comparator means coupled to said detection means for comparing each electrical signal produced in response to the position of each of said plurality of sensing fingers with all other electrical signals produced during each of a plurality of time intervals, each of said plurality of time intervals comprising a said plurality of time instants, in order to determine a maximum electrical signal and a minimum electrical signal for each of said plurality of sensing fingers which occurs during each of said plurality of time intervals;

buffer means coupled to said detector means for temporarily storing said maximum electrical signal and said minimum electrical signal for each of said plurality of sensing fingers during each of said plurality of time intervals.

2. The apparatus for measuring the internal dimensions of a tube within a wellbore according to claim 1, further including a plurality of variable inductors, each of said plurality of variable inductors associated with one of said plurality of sensing fingers wherein movement of a particular one of said plurality of sensing fingers will result in a variation of inductance for an associated variable inductor.

3. The apparatus for measuring the internal dimensions of a tube within a wellbore according to claim 2, wherein said detection means comprises means for detecting variations of inductance of each of said plurality of variable inductors in response to movement of said plurality of sensing fingers at each of a plurality of time instants.

4. The apparatus for measuring the internal dimensions of a tube within a wellbore according to claim 2, wherein each of said plurality of variable inductors comprises an electrical coil and a movable element extending into said electrical coil and movable therein in response to movement of an associated one of said plurality of sensing fingers.

5. The apparatus for measuring the internal dimensions of a tube within a wellbore according to claim 4, wherein each of said movable elements comprises a magnetic rod.

6. The apparatus for measuring the internal dimensions of a tube within a wellbore according to claim 1, further including means for centering said elongate sonde within said tube.

7. The apparatus for measuring the internal dimensions of a tube within a wellbore according to claim 1, wherein said plurality of sensing fingers comprises forty sensing fingers.

8. A method for detecting variations in the internal dimensions of a tube within a borehole, said method comprising the steps of:

suspending a measurement device in a borehole utilizing an electrical conductor and moving said measurement device within a tube to be measured;

repeatedly measuring said internal dimensions of said tube at a plurality of points around the circumference of said tube at each of a plurality of time instants;

comparing each of said measured internal dimensions of said tube at said plurality of points around the circumference of said tube with all other measurements during each of a plurality of time intervals, each of said plurality of time intervals comprising a said plurality of time instants, in order to determine a maximum and minimum internal dimension which occurs during each of said plurality of time intervals;

storing within said measurement device said maximum and minimum internal dimension at each of said plurality of points around the circumference of said tube during each of said plurality of time intervals.

9. An apparatus for measuring the internal dimensions of a tube within a wellbore, said apparatus comprising:

an elongate sonde adapted to be suspended within said wellbore by an electrical conductor and movable within a tube to be measured within said wellbore;

a plurality of sensing fingers mounted on said elongate sonde and movable with respect to said elongate sonde in response to variations in said internal dimensions of said tube, during movement of said elongate sonde within said tube;

a transducer plate mounted within said elongate sonde having a plurality of cylindrical apertures disposed generally about the circumference thereof, each of said plurality of cylindrical apertures having a first end and a second end;

a plurality of thimble members, each of said plurality of thimble members having an internal chamber and an elongate body having an external dimension smaller than an internal dimension of each of said plurality of cylindrical apertures, each of said thimble members sized to be fixedly inserted within an associated cylindrical aperture from a first end thereof;

a plurality of electrical coils, each sized to be inserted within a second end of an associated cylindrical aperture around said elongate body of an inserted thimble member;

means for retaining each of said plurality of electrical coils within an associated cylindrical aperture;

a plurality of movable members, each coupled to an associated sensing finger and movable within a said internal chamber of an associated thimble member in response to movement of said associated sensing finger;

detection means coupled to each of said plurality of electrical coils for producing an electrical signal in response to variations in position of each of said plurality of movable members at each of a plurality of time instants;

comparator means coupled to said detection means for comparing each electrical signal produced in response to variations in position of each of said plurality of movable members with all other electrical signals produced during each of a plurality of time intervals, each of said plurality of time intervals comprising a said plurality of time instants, in order to determine a maximum electrical signal and a minimum electrical signal for each of said plurality of movable members which occurs during each of said plurality of time intervals; and buffer means coupled to said detector means for temporarily storing said maximum electrical signal and said minimum electrical signal for each of said plurality of movable members during each of said plurality of time intervals.

10. The apparatus for measuring the internal dimensions of a tube within a wellbore according to claim 9, further including transmission means coupled to said buffer means for transmitting said stored maximum electrical signal and said stored minimum electrical signal for each of said plurality of movable members via said electrical conductor during each of said plurality of time intervals.

11. The apparatus for measuring the internal dimensions of a tube within a wellbore according to claim 9, wherein each of said thimble members is constructed of a nonmagnetic material.

12. The apparatus for measuring the internal dimensions of a tube within a wellbore according to claim 9, wherein each of said plurality of movable members comprises a magnetic rod.

13. The apparatus for measuring the internal dimensions of a tube within a wellbore according to claim 9, further including means for centering said elongate sonde within said tube.

14. The apparatus for measuring the internal dimensions of a tube within a wellbore according to claim 9, wherein said plurality of sensing fingers comprises forty sensing fingers.

* * * * *